United States Patent Office 3,642,660
Patented Feb. 15, 1972

3,642,660
PREPARATION OF A CATALYTIC COMPOSITE COMPRISING A COMBINATION OF GERMANIUM AND HALOGEN WITH ALUMINA
Roy T. Mitsche, Island Lake, Ill., assignor to Universal Oil Products Company, Des Plaines, Ill.
No Drawing. Filed Aug. 20, 1969, Ser. No. 851,724
Int. Cl. B01j 11/78, 11/44, 11/16
U.S. Cl. 252—442                                    11 Claims

ABSTRACT OF THE DISCLOSURE

A germanium component is uniformly dispersed throughout an alumina carrier material by the steps of: first, uniformly distributing finely divided germanium dioxide particles throughout an aluminum hydroxyl halide sol to form an intimate mixture thereof; second, gelling the resulting mixture to obtain a hydrogel; and, finally, treating and calcining the resulting hydrogel to produce a solid composite having a germanium component uniformly dispersed therein. Key feature of this method involves the preparation of the catalyst from an aluminum hydroxyl halide sol to which finely divided particles of germanium dioxide are added, thereby achieving uniform dispersion of the germanium component in the alumina carrier material and also causing some beneficial interaction between the sol and the germanium dioxide particles. Resulting composite is typically combined with a platinum group component and utilized to accelerate a wide variety of reactions in processes such as hydrocracking, reforming, isomerization, etc.

---

The subject of the present invention is broadly a method of preparing a catalytic composite comprising a germanium component and a halogen component combined with an alumina carrier material in which composite the germanium component is uniformly dispersed. In a narrow aspect, the present invention concerns a method of preparation of a catalystic composite comprising a combination of a platinum group component, a germanium component, and a chlorine component with an alumina carrier material wherein a high dispersion of both the platinum group component and germanium component in the carrier material is achieved.

In the art of preparing catalytic composites, it is typically required that a catalytically active component is combined with a carrier material or support material which may or may not be active for the particular reaction or set of reactions of interest. It is often additionally required that the catalytically active component be uniformly dispersed or distributed throughout the carrier material. The expression "uniformly dispersed" is generally understood in this art to mean that the concentration of the particular component in the carrier material is approximately the same in any divisible portion of the carrier material. This expression is typically employed to distinguish the situation encountered when the catalytically active component is concentrated in a particular portion of the composite. For example, some catalytic composites of the prior art employ so-called surface impregnation techniques to achieve a high concentration of the catalytically active component on the surface of the carrier material with relatively little of this component penetrating the inner region of the carrier material.

Heretofore, catalysts for use in the catalytic conversion art have been relatively simple compositions typically involving one or more catalytically active elements from Group VIII or Group VI-B of the Periodic Table, combined with a carrier material. Responsive to the ever-increasing demands of petroleum refining technologists for increased efficiency in their catalytic conversion processes, this picture with respect to the simplicity of the catalyst compositions used in this art has changed dramatically. Today, the emphasis in this area of the catalyst art has shifted to multi-component catalytic compositions involving some rather unusual catalytic ingredients. One of these ingredients is a germanium component. Germanium is an element of Group IV-A which has rather unusual chemical characteristics because it is in the same family as carbon and silicon, which are non-metals, and tin and lead, which are metals. When an attempt is made to combine a germanium component with a high surface area carrier material via a standard impregnation procedure, substantial difficulty is typically encountered because of the lack of readily available, soluble, and decomposable compounds of germanium. The prior art has, in the main, utilized germanium tetrachloride dispersed in a strong aqueous solution of hydrochloric acid to combine a germanium component with a carrier material. This procedure is undoubtedly quite acceptable when it is desirable to prepare a catalytic composite having a high concentration on the surface of the carrier material and when the carrier material is resistant to attack by the concentrated acid. However, it has been recently determined that a superior catalytic composite can be obtained by uniformly distributing a germanium component throughout an alumina carrier material. In fact, it has been demonstrated that when this last composite is combined with a platinum group component and a halogen component it forms a hydrocarbon conversion catalyst having unusual and extraordinary characteristics of activity, selectivity, and stability when employed in conventional processes which have traditionally utilized dual-function catalytic composites such as reforming hydrocracking, isomerization, and the like processes.

The problem associated with the use of this germanium tetrachloride solution to impregnate a gamma-alumina carrier material is that the germanium tetrachloride tends to rapidly hydrolyze to germanium dioxide on contact with the alumina carrier material with resulting precipitation of solid germanium dioxide on the surface of this carrier material where it tends to remain, except when a high temperature (e.g., 1500° F.) treatment is used to redistribute it. Moreover, the acidity of this impregnation solution typically can cause substantial damage to the alumina carrier material. Therefore, the problem addressed by the present invention involves the preparation of a catalytic composite comprising a germanium component combined with an alumina carrier material where it is required that germanium component be uniformly dispersed therein.

I have now found a method which solves this problem, and the essential feature of my method involves uniformly distributing finely divided particles of germanium dioxide throughout an aluminum hydroxyl halide sol to form a mixture which is then utilized to make the desired catalytic composite as will be explained hereinafter. Quite surprisingly, I have determined that this procedure causes a beneficial interaction between the germanium component and the sol, which results in a very active and selective catalytic composite.

It is, accordingly, an object of the present invention to provide a method of uniformly distributing a germanium component throughout an alumina carrier material. Another object is to provide a method of preparing this type of composite without resorting to excessively high heat treatments to redistribute germanium crystallites in the gamma-alumina carrier material. Yet another object is to provide a method for preparing an alumina carrier material having a germanium component uniformly dispersed therein without damaging the alumina by exposing it to contact with a highly acidic impregnation solution.

In one embodiment, the present invention is a method of preparing a catalytic composite comprising a combination of a germanium component and a halogen component with an alumina carrier material wherein the germanium component is uniformly dispersed. In the first step of the method, finely divided germanium dioxide particles are uniformly distributed throughout an aluminum hydroxyl halide sol to form an intimate mixture of sol and particles. In the next step, the resulting mixture is gelled to obtain a hydrogel. Finally, the resulting hydrogel is treated and calcined to produce a solid composite having a germanium component uniformly dispersed therein.

In a preferred embodiment, the present invention concerns a method of preparing a catalytic composite comprising a combination of a platinum group component, a germanium component, and a chlorine component with an alumina carrier material. In the first step, finely divided germanium dioxide particles are uniformly distributed throughout an aluminum hydroxyl chloride sol to form a mixture thereof. Thereafter, the resulting mixture is gelled to form substantially spherical hydrogel particles. In the next step, the resulting hydrogel particles are treated and calcined to produce solid particles comprising a combination of a germanium component and a chlorine component with alumina. The resulting solid particles are then contacted with a solution containing a soluble, decomposable compound of a platinum group metal at impregnation conditions. In the final step, the resulting impregnated solid particles are dried and oxidized to produce a catalytic composite having a platinum group component and a germanium component uniformly dispersed therein.

Other objects and embodiments of the present invention relates to details about the preferred and essential ingredients for the catalytic composites prepared thereby, the conditions and preferred procedures used in each step therein, and preferred uses for the resulting catalytic composites. These will be hereinafter described in the following detailed explanation of each of these facets of the present invention.

As indicated above, the first essential step of the present invention involves uniformly distributing finely divided germanium dioxide particles throughout an aluminum hydroxyl halide sol prior to the sol being gelled. Although in some cases sols formed with fluorine, bromine, or iodine may be satisfactory, I have found that best results are obtained with an aluminum hydroxyl chloride sol formed by dissolving or digesting substantially pure aluminum metal in hydrochloric acid or in an aqueous solution of aluminum chloride to result in a sol having a weight ratio of aluminum to chloride of about 1:1 to about 1.4:1. Additionally, it is preferred that the sol have a pH of about 3 to about 5. One advantage of this distributing step is the relative ease with which the germanium dioxide particles can be uniformly distributed in the resulting catalyst. Additionally, the halogen present in the sol provides at least a portion of the halogen component for the resulting catalyst. However, the most important advantage is associated with the fact that the sol appears to react with the germanium dioxide causing some basic modification of its structure which enables the resulting composite to possess preferential characteristics of activity, selectivity, and stability when employed in dual-function hydrocarbon conversion processes.

Regarding the size of the germanium dioxide particles, I have found it to be a good practice that these particles be relatively finely divided. In fact, I prefer that they have a particle size of about 1 to about 100 microns, with best results obtained with particles having an average diameter size in the lower portion of this range. As will be shown in the examples, excellent results are obtained with particles having an average diameter of about 5 to about 10 microns.

During the course of this germanium dioxide addition step, it is important that the sol be continuously agitated as the particles are added thereto. Any suitable means can be utilized to achieve this agitation with the preferred procedure typically involving a suitable stirring means capable of vigorous agitation of the sol. The temperature utilized during this addition step is preferably selected from the range of about 50 to about 100° F., with about 70° F. being preferred. Another important parameter for this step is the contact time between the particles and the sol; my finding here is that excellent results are obtained when the particles are allowed to remain in contact with the agitated sol for a period of about 0.25 to about 1 hour before the sol is gelled. This contact time facilitates not only the dispersion of the particles throughout the sol but also the interaction of the sol with the particles.

Following this particle addition step, the resulting mixture of particles and sol are then gelled by adding a suitable gelling agent. This gelling agent is typically a basic compound which increases the pH of the solution in a manner calculated to result in the formation of a gelatinous precipitate. For purposes of the present invention the composite may be formed into any desired shape such as spheres, pellets, pills, cakes, extrudates, powders, granules, etc., and into any desired size. However, a particularly preferred form of the composite is the sphere, and spheres may be continuously manufactured by the well known oil drop method. In this last method, this gelling step is accomplished by adding a suitable gelling agent such as hexamethylenetetramine to the mixture of sol and particles to form a dropping solution. The dropping solution is then passed through a vibrating dropping head and dropped into a forming oil maintained at a temperature of about 120 to about 220° F. The height through which the drops fall is regulated to allow the formation of spherical particles during the descent. Likewise, the rate of vibration and volumetric flow of dropping solution to the dropping head are controlled to produce finished spherical particles having an average diameter of about 1/32 to about 1/2" with the preferred diameter being about 1/16". The droplets remain in the forming oil until they set and form substantially spherical hydrogel particles. Typically, this involves aging the particles at a temperature of about 125 to 220° F. for a period of about 12 to about 24 hours. Thereafter, the particles are typically aged in an ammoniacal solution or other suitable basic solution, at a temperature of about 125 to about 220° F. for an additional period of about 1 to about 10 hours.

The oil used in this preferred dropping procedure is any suitable water-immiscible suspending liquid which will not vaporize at the temperatures employed in the gelling step. Particularly preferred are oils such as kerosine, light fuel oils, Nujol, and the like oils which allow the droplets to settle at a rate such that the mixture sets into a firm hydrogel during its passage through the oil.

After the hydrogel particles are formed and aged, they are washed with water in order to remove soluble salts. The resulting particles are then dried at a temperature of about 100 to about 600° F. for a period of 2 to 24 hours or more. Thereafter, the dried particles are calcined, typically in an air atmosphere, for an additional period of about 1 to about 20 hours at a relatively high temperature of about 850° F. to about 1300° F. This sequence of steps effects conversion of the mixture of germanium dioxide particles and the alumina hydrogel to solid particles comprising a germanium component and a halogen component combined with crystalline gamma-alumina. See U.S. Pat. No. 2,620,314 for additional details regarding the preferred oil drop method.

Regarding the amount of the germanium component contained in the resulting catalytic composite, it typically comprises about 0.01 to about 5 wt. percent of the final composite calculated on an elemental basis with best results obtained when this component comprises about 0.05 to about 2 wt. percent of the resulting composite. In general, it is preferred that this germanium component be maintained in an oxidation state above that of the elemental metal. This is, the germanium component preferably exists in the final catalytic composite in either the +2 or +4 oxidation state. It is a feature of the preparation method of the present invention that it enables the achievement and maintenance of the germanium component in this state.

Reflecting the fact that the alumina sol used in preparation of the subject catalytic composite contains halogen, the composite prepared by the method of the present invention will contain a halogen component. Although the precise form of the chemistry of the association of the halogen component with the alumina support and/or other components of the composite is not entirely known, it is customary in the art to refer to the halogen component as being combined with the alumina carrier material or with other ingredients of the catalyst. This combined halogen may be fluorine, chlorine, iodine, bromine or mixtures thereof. Of these, fluorine and chlorine are preferred for purposes of the present invention, with chlorine giving best results. As indicated previously, a halogen component is inherently incorporated in the composite during the preparation of the germanium-containing alumina carrier material; typically, the preparation procedure described above results in the incorporation of halogen in the resulting composite in an amount of about 0.1 to about 0.5 wt. percent, calculated on an elemental basis. If desired, additional halogen may be added to the alumina carrier material in any suitable manner either during preparation of this carrier material or before, during, or after the addition of the preferred platinum group component. Usually additional halogen is conveniently added to the calcined composite as an aqueous solution of an acid such as hydrogen fluoride, hydrogen chloride, hydrogen bromide, etc. Moreover, an additional amount of the halogen component is typically combined with the composite during the incorporation of the preferred platinum group component; for example, through the utilization of an aqueous impregnation solution containing chloroplatinic acid and hydrogen chloride. In addition, final adjustment of halogen can in many cases be conveniently accomplished by contacting the composite with a gas stream containing a mole ratio of $H_2O$ to HCl of about 20:1 to about 100:1. Regardless of the source of the halogen combined with the composite, the total amount of halogen in the final composite is preferably fixed in the range of about 0.5 to about 3.5 wt. percent, calculated on an elemental basis, and, more preferably at about 0.6 to about 1.2 wt. percent.

The halogen component is utilized in the subject composite for two purposes: one involves the traditional enhancement of the acidic function of the resulting composite; the other involves the maintenance of a uniform distribution of the germanium component in the alumina carrier material. One of the principal effects of incorporating the halogen component in the composite is that it acts to hold or fix the germanium component in a highly dispersed state where it is resistant to subsequent reduction conditions and to deactivation by an agglomerization mechanism.

As indicated above, in a preferred embodiment, the germanium and halogen-containing alumina composite prepared by the method of the present invention is combined with a platinum group component to form a novel dual-function catalyst composite which finds utility in processes such as isomerization, hydroisomerization, desulfurization, denitrogenation, hydrogenation, dehydrogenation, alkylation, dealkylation, disproportionation, oligomerization, transalkylation, cyclization, denitrogenation, cracking, hydrocracking, reforming, and the like processes. The platinum group component may be added to the composite in a number of different ways. For example, the platinum group component may be coprecipitated or cogelled with the germanium-containing alumina carrier material. Similarly, the platinum group component can be added to the germanium-containing alumina carrier material in an impregnation or ion-exchange step either after, before, or during the calcination step which converts the alumina hydrogel to solid particles. In general, I have found best results when the platinum group component is impregnated after the carrier material has been calcined. Thus, the platinum group component is preferably added to the germanium-containing alumina carrier material by mixing same with a solution containing a soluble, decomposable compound of a platinum group. Generally, best results are obtained with an aqueous solution of chloroplatinic acid, although water-soluble compounds of group metals may be utilized including ammonium chloroplatinate, bromoplatinic acid, platinum dichloride, platinum dichlorocarbonyl dichloride, dinitrodiaminoplatinum, palladium chloride, palladium nitrate, palladium sulfate and the like compounds.

Although the platinum group component of the subject catalyst is preferably platinum or a compound of platinum, the scope of the subject invention is intended to include the use of other platinum group metals such as palladium, rhodium, ruthenium, osmium, iridium, and mixtures of same. The platinum group component may exist within the final catalyst composite as a compound such as the oxide, sulfide, halide, oxychloride, or as an elemental metal, with the latter state being preferred. The amount of the platinum group component present in the final component is generally selected from the range of about 0.01 to about 2 wt. percent of the final composite, calculated on an elemental basis. Excellent results are obtained when the composite contains about 0.05 to about 1 wt. percent of the platinum group metal. The preferred platinum group component is platinum or a compound of platinum. Similarly, it is preferred to select the amount of both the germanium and platinum group components so that the atomic ratio of germanium to platinum group metal contained in the composite is about 0.1:1 to 10:1, with best results obtained at 0.2:1 to 5:1.

Regardless of the details of how the platinum group component is combined with the germanium-containing alumina, the final composite generally will be dried at a temperature of about 200 to about 600° F. for a period of from about 2 to about 24 hours or more, and finally calcined at a temperature of about 700° F. to about 1100° F. in an air atmosphere for a period of about 0.5 to about 10 hours in order to convert the platinum group component substantially to the oxide form. Best results are generally obtained when the halogen content of the catalyst is adjusted during the calcination step by including a halogen or a halogen-containing compound in the air atmosphere utilized. In particular, when the halogen component of the catalyst is chlorine, it is preferred to use a mole ratio of $H_2O$ to HCl of about 20:1 to about 100:1 during at least a portion of the calcination step in order to adjust the final chlorine content of the catalyst to a range of about 0.6 to about 1.2 wt. percent.

It is preferred that the resultant calcined catalytic composite be subjected to a substantially water-free reduction step prior to its use in the conversion of hydrocarbons. This step is designed to insure a uniform and finely divided dispersion of both metallic components throughout the carrier material. Preferably, substantially pure and dry hydrogen (i.e., less than 20 vol. p.p.m. $H_2O$) is used as the reducing agent in this step. The reducing agent is contacted with the calcined catalyst at conditions including a temperature of about 800° F. to about 1000° F. selected to reduce the platinum group component to the metallic state while maintaining the germanium component in a positive oxidation state. This reduction step may be performed in situ as part of a start-up sequence if precautions are taken to predry the plant to a substantially water-free state and if substantially water-free hydrogen is used. The duration of this step is preferably less than two hours, and more typically about one hour.

The resulting reduced catalytic composite may, in some cases, be beneficially subjected to a presulfiding step designed to incorporate in the catalytic composite from about 0.05 to about 0.50 wt. percent sulfur calculated on an elemental basis. Preferably, this presulfiding treatment takes place in the presence of hydrogen and a suitable sulfur-containing compound such as hydrogen sulfide, lower molecular weight mercaptans, organic sulfides, etc. Typically, this procedure comprises treating the reduced catalyst with a sulfiding gas such as a mixture of hydrogen and hydrogen sulfide having about 10 moles of hydrogen per mole of hydrogen sulfide at conditions sufficient to effect the desired incorporation of sulfur, generally including a temperature ranging from about 50° F. up to about 1000° F. It is generally a good practice to perform this presulfiding step under substantially water-free conditions.

The resulting catalytic composite finds utility in the broad range of hydrocarbon conversion reactions which have traditionally utilized dual-function hydrocarbon conversion catalysts. Suitable charge stocks, reaction conditions, methods of use, and mechanics of use for all of these hydrocarbon conversion processes are well known to those skilled in the art and will not be repeated here. It is sufficient to note that the catalytic composite prepared by the method of the present invention can be utilized in the conversion of hydrocarbons according to the methods and techniques well known to those skilled in the art. In particular, it gives excellent results in a catalytic reforming process.

The following examples are given to illustrate further the preparation of a catalytic composite by the method of the present invention and the use thereof in a reforming process. It is understood that these examples are given for the sole purpose of illustrating a preferred embodiment of the present invention and a preferred mode of using same.

EXAMPLE I

Aluminum metal having a purity of 99.99 wt. percent was digested in an aqueous solution of hydrochloric acid to produce an aluminum hydroxyl chloride sol having a weight ratio of aluminum to chloride of about 1.15:1 and a specific gravity of 1.34. Finely divided germanium dioxide particles were then added to this sol in an amount calculated to result in a final catalytic composite containing 0.25 wt. percent germanium, calculated on an elemental basis. These germanium dioxide particles were in the form of a fine powder and had an average particle size of about 5 to 10 microns. During the course of the addition of these particles to the sol, the sol was vigorously agitated with an appropriate stirring means to insure uniform distribution of these germanium dioxide particles throughout the sol. This mixing step was performed at a temperature of about 70° F. for a period of about 5 minutes. The resulting mixture of sol and particles was then stirred for an additional period of about 15 minutes. Thereafter, an aqueous solution containing about 28 wt. percent hexamethylenetetramine was added to the resulting mixture at a volumetric ratio of about 1:1 to form a dropping solution.

The dropping solution containing the dispersed particles of germanium dioxide was then passed through a vibrating dropping head and dropped in discrete spherical particles into a forming oil maintained at a temperature of about 200° F. The rate of vibration, height of the dropping head above the oil bath, and the volumetric rate of flow of dropping solution to the dropping head were controlled to produce finished spherical particles of about $\frac{1}{16}$ of an inch in diameter. The droplets were set to a firm hydrogel during passage through the forming oil. The resulting hydrogel spheres were aged in oil overnight (i.e., about 16 hours) and then separated from the oil and aged in an ammoniacal solution for an additional 3 hours at a temperature of about 200° F.

The resulting aged spherical particles were then washed with an aqueous solution to remove neutralization salts therefrom. The washed particles were then dried at a temperature of about 300° F. for about 2 hours. Following drying the particles were calcined in dry air at 1100° F. for 4 hours to yield solid particles of gamma-alumina containing a halogen component and a germanium component. These particles had an apparent bulk density of about 0.6 gm./cc. a surface area of about 200 m.²/gm., a pore volume of about 0.5 ml./gm. and an average pore diameter of about 105 angstroms. An analysis of the resulting particles showed them to contain approximately 0.25 wt. percent germanium and about 0.2 wt. percent chloride.

An aqueous solution containing hydrogen chloride and chloroplatinic acid was then prepared. The amount of chloroplatinic acid contained therein was selected to result in a final catalytic composite containing about 0.375 wt. percent platinum. The amount of hydrogen chloride contained therein was about 2 wt. percent of the germanium-containing alumina carrier material which was subsequently impregnated. Thereupon, the particles of the germanium-containing alumina carrier material were contacted with the chloroplatinic acid solution at impregnation conditions. This contacting was effected while the solution was being stirred and the volume of the impregnation solution was approximately twice the volume of the alumina particles utilized. The impregnation mixture was maintained at contact with the alumina particles for a period of about ½ hour at a temperature of about 70° F. Thereafter, the temperature of the alumina particles and impregnation solution was raised to about 225° F. with evaporation of excess solution. This drying step took about 1 hour. The resulting dried particles were then subjected to an oxidation treatment in an air atmosphere at about 975° F. for about 1 hour. In order to adjust the halogen component of the final composition to an amount of about 0.9 wt. percent of the composite, the calcined spheres were then contacted with an air stream containing $H_2O$ and HCl in a mole ratio of about 40:1 for about 4 hours at 975° F.

A portion of the resulting composite was then analyzed and found to contain, on an elemental basis, about 0.375 wt. percent platinum, about 0.25 wt. percent germanium, and about 1.0 wt. percent chloride. The analysis also showed the germanium and platinum components to be uniformly distributed throughout the alumina carrier material; that is, the concentration of these components at the center of the particles was substantially the same as that measured at the surface of the particles.

Thereafter, the catalyst particles were subjected to a dry pre-reduction treatment by contacting them with a substantially pure hydrogen stream, containing less than 20 volume parts per million $H_2O$, at a temperature of about 1000° F., a pressure slightly above atmospheric and a flow rate corresponding to a gas hourly space velocity of about 720 hr.$^{-1}$. This pre-reduction step was for a duration of about 1 hour.

EXAMPLE II

In order to compare the catalytic composite prepared by the method of the present invention with a high quality reforming catalyst of the prior art, a comparison test was made between the catalyst prepared in Example I and a control catalyst comprising a combination of a platinum component and a halogen component with a gamma-alumina carrier material. This control catalyst contained no germanium component, but, except for this, it was prepared in a manner analogous to that described in Example I. That is, the control catalyst was a combination of platinum and chlorine with a gamma-alumina carrier material which was prepared by a manner analogous to that given in Example I except for the inclusion of the germanium component and contained, on an elemental basis, about 0.75 wt. percent platinum and about 0.85 wt. percent chlorine.

These catalysts were then separately subjected to a high stress evaluation test designed to determine their relative activity, selectivity, and stability for the reforming of a gasoline charge stock. In all tests the same charge stock was utilized, its characteristics are given in Table I. It is to be noted that this test is conducted under a substantially water-free condition with the only significant source of water being the 5.9 wt. p.p.m. present in the charge stock.

TABLE I—ANALYSIS OF HEAVY KUWAIT NAPHTHA

| | |
|---|---|
| API gravity at 60° F. | 60.4 |
| Initial boiling point, ° F. | 184 |
| 10% boiling point, ° F. | 205 |
| 50% boiling point, ° F. | 256 |
| 90% boiling point, ° F. | 321 |
| End boiling point, ° F. | 360 |
| Sulfur, wt. p.p.m. | 0.5 |
| Nitrogen, wt. p.p.m. | 0.1 |
| Aromatics, vol. percent | 8 |
| Paraffins, vol. percent | 71 |
| Naphthenes, vol. percent | 21 |
| Water, p.p.m. | 5.9 |
| Octane No., F-1 clear | 40.0 |

This test was specifically designed to determine in a very short time period whether the catalyst being evaluated has superior characteristics for the reforming process. It consists of six periods comprising a 12 hour line-out period followed by a 12 hour test period run at a constant temperature during which time a $C_5^+$ product reformate is collected. It was performed in a laboratory scale reforming plant comprising a reactor containing the catalyst, hydrogen separation zone, a debutanizer column, suitable heating, pumping, and condensing means, etc.

In this plant, a hydrogen recycle stream and the charge stock are commingled and heated to the desired conversion temperature. The resulting mixture is then passed downflow into a reactor containing the catalyst as a fixed bed. An effluent stream is then withdrawn from the bottom of the reactor, cooled to about 55° F., and passed to the separating zone wherein a hydrogen-rich gaseous phase separates from a liquid phase. A portion of the gaseous phase is continuously passed through a high surface area sodium scrubber and the resulting substantially water-free hydrogen stream recycled to the reactor in order to supply hydrogen for the reaction and the excess over that needed for plant pressure is recovered as excess separator gas. Moreover, the liquid phase from the separating zone is withdrawn therefrom and passed to the debutanizer column wherein light ends are taken overhead as debutanizer gas and a $C_5^+$ reformate stream recovered as bottoms.

Conditions utilized in this test are: an outlet reactor pressure of 300 p.s.i.g., a liquid hourly space velocity of 3 hr.$^{-1}$ and an inlet reactor temperature which was continuously adjusted throughout the test in order to achieve and maintain a $C_5^+$ target octane of 100 F-1 clear.

This test is designed to quickly and efficiently yield information on the activity, selectivity and stability characteristics of the catalyst being tested. The conditions utilized are selected on the basis of experience to yield the maximum amount of information on the capability of the catalyst being tested to respond to a high severity operation.

The results of the separate tests performed on the catalyst of the present invention and the control catalyst are presented for each test period in Table II in terms of inlet temperature to the reactor in ° F., $C_5^+$ yield on a vol. percent of feed basis, net excess separator gas in standard cubic feet per barrel of charge (s.c.f./bbl.), debutanizer overhead gas in standard cubic feet per barrel, and the ratio of the debutanizer gas make to the total gas make.

In addition, the respective catalysts were analyzed for carbon content after the completion of test. The results showed that the catalyst of the present invention contained 2.92 wt. percent carbon which was in marked contrast to the 7.84 wt. percent carbon which was found on the control catalyst. These results evidence an additional advantage associate with the catalysts prepared by the present invention: the capability to suppress the rate of deposition of carbonaceous materials thereon during the course of the reforming reaction.

TABLE II.—RESULTS OF ACCELERATED REFORMING TESTS

Catalyst of the present invention—.375 wt. percent Pt, 0.25 wt. percent Ge and 1.00 wt. percent Cl

| Period No. | Temp., ° F. | $C_5^+$ vol., percent yield | Separator gas, s.c.f./bbl. | Debutanizer, gas s.c.f./bbl. | Debut. gas/total gas ratio |
|---|---|---|---|---|---|
| 1 | 1,011.5 | 72.5 | 1,322 | 230 | .148 |
| 2 | 1,015.5 | 73.3 | 1,332 | 233 | .149 |
| 3 | 1,019.5 | 72.8 | 1,338 | 231 | .147 |
| 4 | 1,019.0 | 73.2 | 1,346 | 229 | .145 |
| 5 | 1,022.0 | 72.9 | 1,342 | 234 | .148 |
| 6 | 1,024.0 | 72.4 | 1,347 | 240 | .151 |

Control catalyst—.75 wt. percent Pt and .85 wt. percent Cl

| | | | | | |
|---|---|---|---|---|---|
| 1 | | | | | |
| 2 | 1,035.5 | 68.7 | 1,287 | 267 | .172 |
| 3 | | | | | |
| 4 | 1,051.5 | 64.9 | 1,163 | 353 | .233 |
| 5 | | | | | |
| 6 | 1,072.0 | 59.5 | 1,005 | 436 | .302 |

Referring now to the results of the separate tests performed in Table II, it is evident that the effect of the germanium component on the catalyst is to substantially promote the platinum metal component and to enable a catalyst containing less platinum to out-perform a catalyst containing a substantially greater amount of platinum. That is to say, the catalyst of the present invention is sharply superior to the control catalyst in both activity and selectivity. A good measure of activity for a reforming catalyst is temperature required to make octane, all other conditions being the same; on this basis, the catalyst of the present invention was materially active than the control catalyst throughout the test. However, activity is only half of the story: activity must be coupled with selectivity to demonstrate superiority. Selectivity is measured directly by reference to $C_5^+$ yield and indirectly by reference to separator gas make, which is roughly proportional to net hydrogen make which in turn is a product of the preferred upgrading reactions and by reference to debutanizer gas make which is a rough measure of undesired hydrocracking and should be minimized for a highly selective catalyst. Referring again to the data presented in Table II and using the selectivity criteria, it is manifest that the catalyst of the present invention is materially more selective than the control catalyst.

Likewise, good indications of stability are the rate of change of temperature required to make octane and rate of decline of $C_5^+$ yield at octane. Applying these criteria to the data presented in Table II, it is apparent that the catalyst prepared by the present invention is significantly more stable than the control catalyst.

I claim as my invention:

1. A method of preparing a catalytic composite comprising a combination of a germanium component and a halogen component with an alumina carrier material, the germanium component being uniformly dispersed throughout the alumina carrier material, said method comprising the steps of:

(a) uniformly distributing finely divided germanium dioxide particles throughout an aluminum hydroxyl halide sol to form an intimate mixture thereof;

(b) gelling the resulting mixture to obtain a hydrogel; and (c) aging, washing, drying and calcining the resulting hydrogel to produce a solid composite having a germanium component uniformly dispersed therein.

2. A method as defined in claim 1 wherein the sol is an alumina hydroxyl chloride sol having a weight ratio of alumina to chloride of about 1:1 to about 1.4:1.

3. A method as defined in claim 1 wherein step (b) comprises the substeps of:

(1) adding a gelling agent to said mixture to form a dropping solution; and (2) dropping the resulting solution into an oil bath to form substantially spherical hydrogel particles.

4. A method as defined in claim 3 wherein said gelling agent is hexamethylenetetramine.

5. A method of preparing a catalytic composite comprising a combination of a platinum group component, a germanium component, and a chlorine component with an alumina carrier material, the composite having the germanium component and the platinum group component uniformly dispersed therein, said method comprising the steps of:

(a) uniformly distributing finely divided germanium dioxide particles throughout an aluminum hydroxyl chloride sol to form a mixture thereof;

(b) gelling the resulting mixture to form substantially spherical hydrogel particles;

(c) aging, washing, drying and calcining the resulting hydrogel particles to produce solid particles comprising a combination of a germanium component and a chlorine component with alumina;

(d) contacting the resulting solid particles with a solution containing a soluble, decomposable compound of a platinum group metal at impregnation conditions; and thereafter (e) drying and oxidizing the resulting impregnated solid particles to produce a catalytic composite having a platinum group component and a germanium component uniformly distributed therein.

6. A method as defined in claim 5 wherein said platinum group component of the composite is platinum or a compound of platinum and wherein the compound utilized in step (d) is a soluble, decomposable compound of platinum.

7. A method as defined in claim 6 wherein the soluble, decomposable compound of platinum utilized in step (d) is chloroplatinic acid.

8. A method as defined in claim 5 wherein said particles of germanium dioxide have an average diameter of about 1 to about 100 microns.

9. A method as defined in claim 5 wherein step (b) comprises the substeps of:

(1) adding a gelling agent to said mixture to form a dropping solution; and (2) dropping the resulting solution into an oil bath to form substantially spherical hydrogel particles.

10. A method as defined in claim 9 wherein said gelling agent is hexamethylenetetramine.

11. A method as defined in claim 5 wherein the catalytic composite resulting from step (e) is thereafter subjected to contact with a hydrogen stream at reduction conditions selected to reduce the platinum group component while maintaining the germanium component in an oxidation state above that of the elemental metal thereby producing a catalytic composite comprising a combination of a platinum group metal, germanium dioxide, and a chloride component with an alumina carrier material.

References Cited

UNITED STATES PATENTS

| | | | |
|---|---|---|---|
| 2,805,206 | 9/1957 | John et al. | 252—448 |
| 2,906,701 | 9/1959 | Stine et al. | 208—138 |
| 2,914,464 | 11/1959 | Burton et al. | 208—138 |
| 3,114,720 | 12/1963 | Nixon | 252—448 |
| 3,313,739 | 4/1967 | Acker | 252—451 |
| 3,428,572 | 2/1969 | Michalko | 252—463 X |
| 3,464,928 | 9/1969 | Mathies | 252—448 X |

DANIEL E. WYMAN, Primary Examiner

P. E. KONOPKA, Assistant Examiner

U.S. Cl. X.R.

208—138; 252—317, 448, 463, 466 PT